United States Patent Office 3,073,632
Patented Jan. 15, 1963

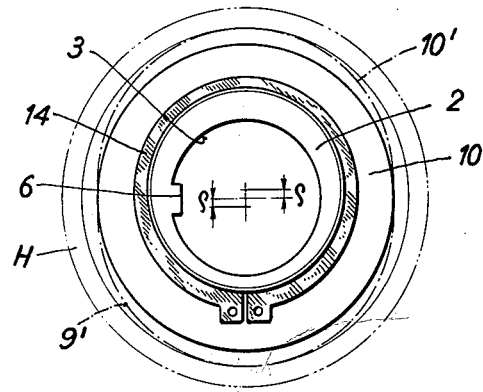
Fig. 1
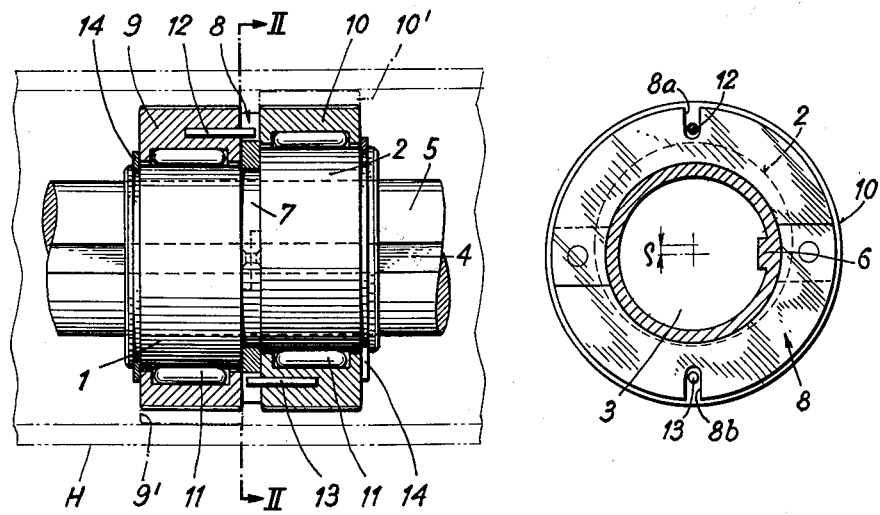
Fig. 2
Fig. 3

3,073,632
ARRANGEMENT FOR THE AUTOMATIC CO-
AXIAL CLAMPING OF A SLEEVE OVER A
SHAFT
Heinrich Grünbaum, Bollwerkstrasse 18,
Binningen, Basel-Land, Switzerland
Filed Sept. 22, 1958, Ser. No. 762,473
Claims priority, application Switzerland Sept. 20, 1957
9 Claims. (Cl. 287—52.09)

The present invention has for its object an arrangement for the automatic coaxial clamping of a sleeve over a shaft, the clamping means having in their starting position a smaller overall size than the diameter of the bore in the sleeve, as generally applied for instance in coiling machines for the transient securing to the coiling shaft of a cardboard sleeve forming the core of the winding to be formed.

According to the invention, this arrangement includes a series of eccentrics distributed over 360° and connected with the shaft, the eccentricities being equal for groups of at least two eccentrics while an eccentric ring forming one of the actual clamping members is revolubly fitted over each eccentric, said clamping members being operatively interconnected in a manner such that a relative angular shifting of one clamping member with reference to the shaft may produce an angular shifting of all the clamping members in a direction providing an expansion of the clamping arrangement, depending on the torque applied.

Accompanying drawings illustrate an example of the arrangement according to the invention. In said drawings:

FIG. 1 is an end view of the arrangement.
FIG. 2 is a longitudinal cross-section thereof.
FIG. 3 is a cross-section through line II—II of FIG. 2.

The arrangement illustrated includes two eccentric members 1 and 2 having circular peripheral surfaces whose centers are eccentric to the axis of shaft 5 the same radial distances and which are angularly spaced from each other an angle of 180°. The eccentric members are made of a single piece of solid material and juxtaposed round successive sections of the coiling shaft 5 so as to form together a bushing. The bore 3 formed in said bushing is provided with a longitudinal inner rib 6 which ensures a torsion-free connection with the said shaft 5 illustrated in FIG. 2 and provided with a longitudinal groove 4 engaged by said rib. Each eccentric 1 or 2 has side walls of gradually increasing and decreasing thickness and is provided along its peripheral surface with a milled eccentric clamping ring 9 or 10, said rings being revolubly fitted with the interposition of needle bearings 11 over the first mentioned eccentrics. Members 1 and 2 are arranged with the thickest wall of one member at 180° angular relationship with respect to the corresponding part of the other member. Where the wall of one member is thick, the wall of the other member is thin.

Clamping rings 9 and 10 have gradually thicker and thinner walls so that upon turning of rings 9 and 10 on the peripheral surface of members 1 and 2 the extremities of the clamping rings move radially relative to each other between an expanded clamping position and a contracted position.

Between the two eccentrics 1 and 2, an annular groove 7 is formed on the bushing coaxial with the shaft 5 and inside which is revolubly fitted a movement transferring ring 8 constituted for instance by two semi-annular elements in overlapping relationship riveted together after their assembling. This movement transferring ring is provided along its periphery with two diametrically opposed slots 8a and 8b engaged respectively by the studs 12 and 13 raised on the cooperating lateral surfaces of the corresponding eccentric rings 9 and 10. Both these eccentric rings are in contact through their cooperating lateral surfaces with the movement transferring ring 8. Axial shifting of the eccentric rings over the eccentrics 1 and 2 is prevented by elastic rings fitted on the eccentric bushing and forming outer safety means, said elastic rings engaging the outer lateral surfaces of the eccentric rings. The value of the eccentricity of the eccentric rings 9 and 10 and the angular setting thereof on the actual eccentrics 1 and 2 are such that for the starting position of the arrangement as illustrated in FIGS. 1 and 2, the outer peripheries of the two eccentric rings form two equal circles having their common center on the axis of said arrangement, i.e. on the axis of the shaft.

The arrangement described is applicable to the securing of sleeves the inner diameter of which is larger than the outer diameter of the eccentric rings 9 and 10 while it is smaller than the overall size of the associated rings 9 and 10 in their position of maximum relative angular shifting.

The operation of the arrangement is as follows:

A sleeve H, shifted over the arrangement and revoluble with reference thereto, as illustrated in dot-and-dash lines in FIG. 2, engages through its inner wall one of the clamping members, say the eccentric clamping ring 9 and shifts the latter angularly by reason of the resistance opposed at its periphery, so that said ring moves over the corresponding eccentric 1 in the same direction as the sleeve. Simultaneously the clamping ring 9 shifts angularly to the same extent and in the same direction as the other clamping ring 10 to the same extent and in the same angular direction over the eccentric 2 through the agency of the stud 12, movement-transferring ring 8 and stud 13. By reason of the eccentricity defined hereinabove of the two eccentrics 1 and 2 and of the eccentric rings 9 and 10, the clamping member is urged through its angular shifting into its outwardly projecting position 9' illustrated in dot-and-dash lines in FIGS. 1 and 2 while the other clamping member 10 enters its corresponding outwardly projecting position 10'. Thus, the two clamping rings engage the inner wall of the sleeve H whereby the clamping arrangement is expanded and accurately centers said sleeve and secures same in accordance with the torque applied without any further manual application of force being required.

Instead of the two eccentrics described carrying the corresponding eccentric rings, it is possible to incorporate with the arrangement three or more eccentrics and corresponding eccentric rings, the distribution of the latter being then in the case of an odd number of eccentrics a uniform one throughout 360° and in the case of an even number a symmetrical distribution to either side of a transverse axis throughout 360° with a view to obtaining an accurate centering of the sleeve.

What I claim is:

1. Clamping device comprising, in combination, means adapted to be connected to a shaft for rotation therewith about an axis and including at least two circular peripheral surfaces having centers located eccentric to said axis, said centers being spaced from each other equal angular distances about said axis; a clamping member turnably mounted on each of said peripheral surfaces and having an outer peripheral clamping surface eccentric to the respective associated circular peripheral surface; and means connecting said clamping members for simultaneous turning movement on said circular peripheral surfaces so that the lines of intersection of said peripheral clamping surfaces of said clamping members with a median plane passing through and parallel to said axis move radially on said plane for various rotary angular positions of said clamping members and so that the points of said two outer peripheral clamping surfaces farthest spaced from said axis are uniformly spaced about said axis in circumferential direction whereby during turning movement of said clamping members the radial distance between said points varies between a farther spaced position for clamping a sleeve surrounding the shaft and a closer spaced position for releasing the sleeve.

2. Clamping device comprising, in combination, means adapted to be connected to a shaft for rotation therewith about an axis and including at least two circular peripheral surfaces having centers located eccentric to said axis, said centers being spaced from each other equal angular distances about said axis; a clamping ring turnably mounted on each of said peripheral surfaces and including an outer clamping surface eccentric to the respective associated peripheral circular surface; and means connecting said clamping rings for simultaneous turning movement on said peripheral surfaces so that the lines of intersection of said peripheral clamping surfaces of said clamping rings with a median plane passing through and parallel to the axis of said shaft move radially on said plane for various rotary angular positions of said clamping rings and so that the points of said two outer clamping surfaces farthest spaced from said axis are uniformly spaced about said axis in circumferential direction whereby during relative turning movement between said clamping rings and said shaft the radial distance between said points varies between an expanded position for clamping a sleeve surrounding the shaft and a contracted releasing position for releasing the sleeve.

3. Clamping device comprising, in combination, means adapted to be connected to a shaft for rotation therewith about an axis and including at least two circular peripheral surfaces having centers located eccentric to said axis, said centers being spaced from each other equal angular distances about said axis; a clamping ring turnably mounted on each of said peripheral surfaces and including an outer circular clamping surface having a center eccentric to the center of the respective associated peripheral circular surface a distance equal to the distance between the centers of the respective circular peripheral surfaces and said axis of rotation; and connecting means connecting said clamping rings for simultaneous turning movement on said peripheral surfaces so that the lines of intersection of said peripheral clamping surfaces of said clamping members with a median plane passing through and parallel to the axis of said shaft move radially on said plane for various rotary angular positions of said clamping rings and so that the points of said two outer clamping surfaces farthest spaced from said axis are uniformly spaced about said axis in circumferential direction whereby during relative turning movement between said clamping rings and said shaft the radial distance between said points varies between an expanded position for clamping a sleeve surrounding the shaft and a contracted releasing position in which the centers of said circular clamping faces coincide with said axis so that said clamping surfaces are concentric to said axis.

4. A clamping device as set forth in claim 3 wherein said connecting means for connecting said clamping rings for rotation include means permitting relative movements of said clamping rings in radial direction.

5. Apparatus of the class described for coaxially clamping a sleeve on a shaft, said apparatus comprising at least two eccentric but coaxail members rigidly arranged relative to each other, said eccentrics being substantially alike but having the eccentric sections thereof arranged at different angular locations with respect to the axis forming a bushing for receiving the shaft, means fixing the shaft to said eccentrics, an eccentric clamping ring revolubly mounted on each eccentric member for engagement with the inner surface of the sleeve to be clamped to the shaft, each clamping ring having an eccentric outer clamping surface, and means inter-connecting said clamping rings for simultaneous turning movement on said peripheral surfaces so that the lines of intersection of said peripheral clamping surfaces of said clamping members with a median plane passing through and parallel to the axis of said shaft move radially on said plane for various rotary angular positions of said clamping rings and so that the points of said two outer clamping surfaces farthest spaced from said axis are uniformly spaced about said axis in circumferential direction whereby during relative turning movement between said clamping rings and said shaft the radial distance between said points varies between an expanded position for clamping the inner surface of said sleeve and a contracted position for releasing said sleeve.

6. Apparatus of the class described for coaxially clamping a sleeve to a shaft, said apparatus comprising a bushing to receive the shaft, means to rotationally fix the shaft to the bushing, said bushing including a pair of eccentric sections, circular peripheral surfaces having their points of extreme eccentricity arranged at different circumferential points, a ring mounted on said peripheral surface of each eccentric section for rotational motion with respect thereto and thereon, each ring having an outer eccentric clamping surface with a radial projection, and means connecting said rings for simultaneous turning movement on said peripheral surfaces so that the lines of intersection of said peripheral clamping surfaces of said clamping rings with a median plane passing through the axis of and parallel to said shaft move radially on said plane for various rotary angular positions of said clamping rings and so that the points of said projections farthest spaced from said axis are uniformly spaced about said axis in circumferential direction whereby during relative turning movement between said clamping rings and said shaft the radial distance between said points varies between an expanded position for clamping the inner surface of said sleeve and a contracted position for releasing said sleeve.

7. The apparatus of claim 6, wherein the points of extreme eccentricity of the sections are substantially 180° of angularity apart; and wherein said projections of said rings are 180° of angularity apart.

8. The apparatus of claim 6, including bearings between the eccentric sections and the rings.

9. A clamping device comprising means adapted to be connected to a shaft for rotation therewith about an axis, and including at least two circular peripheral surfaces having centers located eccentric to said axis radially spaced from the same, said centers being spaced equal angular distances from each other and about said axis; a clamping member turnably mounted on each of said circular peripheral surfaces and having a radially projecting portion, each clamping member being turnable through an angle of 180° between two positions in which said projecting portion is located in a radial plane passing through said axis and through the center of the corresponding circular peripheral surface, the extremity of each projecting portion being farther spaced from said axis in a first position of said two positions in which first position said center and said projecting portion are located on the same side of said axis than in the second position of said positions in which said second position said center and said projecting portions are located on different sides of said axis so that the extremities of said projecting portions are farther spaced in radial direction when both said clamping members are in said first positions than when both said clamping members are in said second position so that said clamping members in said first positions are adapted to clamp thereof, said eccentrics having a common inner wall a sleeve surrounding said clamping members, and are adapted to release the sleeve when both said clamping members are in said second positions; and connecting means connecting said clamping members for simultaneous turning movement on said peripheral surfaces and for radial displacement of the lines of intersection of the outer surfaces of said clamping members with a median plane passing through and parallel to said axis on said plane for various rotary angular positions of said clamping members.

References Cited in the file of this patent

UNITED STATES PATENTS

| | | |
|---|---|---|
| 954,957 | Harriman et al. | Apr. 12, 1910 |
| 1,323,855 | Goordman | Dec. 2, 1919 |
| 2,366,081 | Wood | Dec. 26, 1944 |
| 2,843,388 | Butler | July 15, 1958 |